US011747553B1

United States Patent
Kakuda et al.

(10) Patent No.: US 11,747,553 B1
(45) Date of Patent: Sep. 5, 2023

(54) ELECTRONIC DEVICES WITH INHOMOGENEOUS IMAGE TRANSPORT LAYERS

(71) Applicant: Apple Inc., Cupertino, CA (US)

(72) Inventors: Tyler R. Kakuda, San Francisco, CA (US); Elizabeth C. Porter, Sunnyvale, CA (US); Jean-Pierre S. Guillou, Los Gatos, CA (US); Michael J. Brown, Campbell, CA (US); Paul C. Kelley, San Francisco, CA (US); Salman Karbasi, San Jose, CA (US); Shubhaditya Majumdar, Santa Clara, CA (US); Yi Qiao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 200 days.

(21) Appl. No.: 17/026,063

(22) Filed: Sep. 18, 2020

Related U.S. Application Data

(60) Provisional application No. 62/905,561, filed on Sep. 25, 2019.

(51) Int. Cl.
*G02B 6/06* (2006.01)
*G02B 6/02* (2006.01)

(52) U.S. Cl.
CPC ............ *G02B 6/06* (2013.01); *G02B 6/02052* (2013.01)

(58) Field of Classification Search
CPC ............. G02B 6/04; G02B 6/06; G02B 6/065
See application file for complete search history.

(56) References Cited

U.S. PATENT DOCUMENTS

| 6,600,861 | B2 | 7/2003 | Furusawa et al. |
| 8,668,640 | B2 | 3/2014 | MacAulay et al. |
| 8,976,324 | B2 * | 3/2015 | Yang ................. G02F 1/133524 349/158 |
| 9,274,369 | B1 | 3/2016 | Lee et al. |
| 9,568,800 | B1 * | 2/2017 | Sprague ............. G02F 1/16753 |
| 10,223,952 | B2 | 3/2019 | Powell et al. |
| 10,353,144 | B2 | 7/2019 | Dong et al. |
| 10,579,157 | B1 | 3/2020 | Wilson |
| 10,620,365 | B2 | 4/2020 | Dawson |
| 10,788,908 | B2 * | 9/2020 | Jung ................... H04M 1/0283 |
| 11,435,520 | B1 * | 9/2022 | de Jong ................... G02B 1/14 |
| 2005/0243415 | A1 | 11/2005 | Lowe et al. |
| 2011/0025594 | A1 | 2/2011 | Watanabe |

(Continued)

*Primary Examiner* — Daniel Petkovsek
(74) *Attorney, Agent, or Firm* — Treyz Law Group, P.C.; G. Victor Treyz; Tianyi He

(57) ABSTRACT

An electronic device may have a display overlapped by an image transport layer such as a coherent fiber bundle or layer of Anderson localization material. The image transport layer may have an input surface that receives an image from the display and a corresponding output surface to which the image is transported. The input surface and output surface may have different shapes. During fabrication of the image transport layer, molding techniques, grinding and polishing techniques, and other processes may be used to deform the image transport layer and the shape of the output surface. To accommodate differences in material deformation and other factors that vary as a function of position across the image transport layer, the image transport layer may be formed from canes of fibers or other material with one or more properties that vary as a function of position.

19 Claims, 13 Drawing Sheets

(56) References Cited

U.S. PATENT DOCUMENTS

2018/0128973 A1    5/2018  Powell et al.
2018/0164923 A1*   6/2018  Hirabayashi ...... G02F 1/133308
2019/0391326 A1   12/2019  Yang et al.

* cited by examiner

ELECTRONIC DEVICES WITH INHOMOGENEOUS IMAGE TRANSPORT LAYERS

This application claims the benefit of provisional patent application No. 62/905,561, filed Sep. 25, 2019, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. The shape and other characteristics of many displays can pose challenges during integration into an electronic device, particularly in situations where space is limited.

SUMMARY

An electronic device may have a housing with a display. The display may be overlapped by an image transport layer such as a coherent fiber bundle or layer of Anderson localization material.

The image transport layer may have an input surface that receives an image from the display and a corresponding output surface to which the image is transported. The input surface and output surface may have different shapes. During fabrication of the image transport layer, molding techniques, grinding and polishing techniques, and other processes may be used to deform the image transport layer and therefore deform the shape of the output surface. For example, the periphery of the image transport layer may be expanded and curved during molding and other shaping operations.

These fabrication processes tend to alter the image transport layer in the periphery of the image transport layer relative to the center of the image transport layer. To accommodate these differences, blocks of image transport layer material may be formed that have one or more properties that vary as a function of position. When molded and otherwise shaped to form image transport layers, these position-dependent properties may help to counteract the effects of processing the peripheral portions of the image transport layers. Position-dependent properties may help reduce risk of damage to the image transport layer during use, may help equalize optical performance and other properties across the surface of the image transport layer, may help accommodate electrical and optical components in an electronic device and may provide other benefits.

With an illustrative arrangement, the stiffness (elastic modulus) or other physical properties of an image transport layer is varied as a function of distance from the center of the layer towards the peripheral edge of the layer. This may help to spread out the amount of expansion experienced at the output surface.

If desired, the amount of light absorption or other optical properties may be varied. For example, the periphery of the image transport layer may be provided with fiber cores, cladding, and/or binder that absorbs more stray light than the center of the image transport layer.

Configurations for image transport layers may also be provided in which different properties are varied (e.g., electrical properties, etc.), in which multiple properties are varied (e.g., optical, physical, electrical, etc.) and/or in which different patterns of varied properties are used (e.g., step-wise changes, changes in window regions, changes in peripheral strips such as U-shaped strips, etc.).

Properties may be varied by assembling (e.g., fusing, molding, etc.) canes of fibers into blocks of image transport layer material, by adjusting the properties of fibers during winding of fibers onto a guide structure on a wheel, by modifying the surface and/or bulk properties of image transport layer material before and/or after molding, grinding, and/or by otherwise shaping fibers or other material to form finished inhomogeneous image transport layers for electronic devices.

DETAILED DESCRIPTION

An electronic device may have a display. The display may have an array of pixels for creating an image. The image may pass through a display cover layer that overlaps the array of pixels. To minimize display borders or to otherwise create a desired appearance for the display, the display cover layer may include an image transport layer. The image transport layer may have an input surface that receives an image from the array of pixels and a corresponding output surface to which the image is transported from the input surface. A user viewing the image transport layer will view the image from the array of pixels as being located on the output surface.

In configurations in which the input and output surfaces have different shapes, the image transport layer may be used to warp the image produced by the array of pixels. For example, the shape of the image can transformed and the effective size of the image can be changed as the image passes through the image transport layer. In some configurations, edge portions of the image are stretched outwardly to help minimize display borders.

Image transport layers can be formed from coherent fiber bundles (sometimes referred to as fiber optic plates) and/or Anderson localization material. Glass and/or polymer may be used in forming image transport layer structures. To help protect the output surface of an image transport layer, an optional transparent protective layer may be included on the outer surface of the display cover layer. This transparent protective layer may be, for example, a glass plate, or a protective layer formed from other transparent material such as clear polymer or sapphire or other crystalline materials. In some arrangements, image transport layers and/or protective layers can be formed over components other than displays.

It may be desirable for an image transport layer to have properties that are not uniform. By varying one or more properties of an image transport layer as a function of position in the layer, optical and/or mechanical image transport layer performance can be enhanced.

Figure 1:
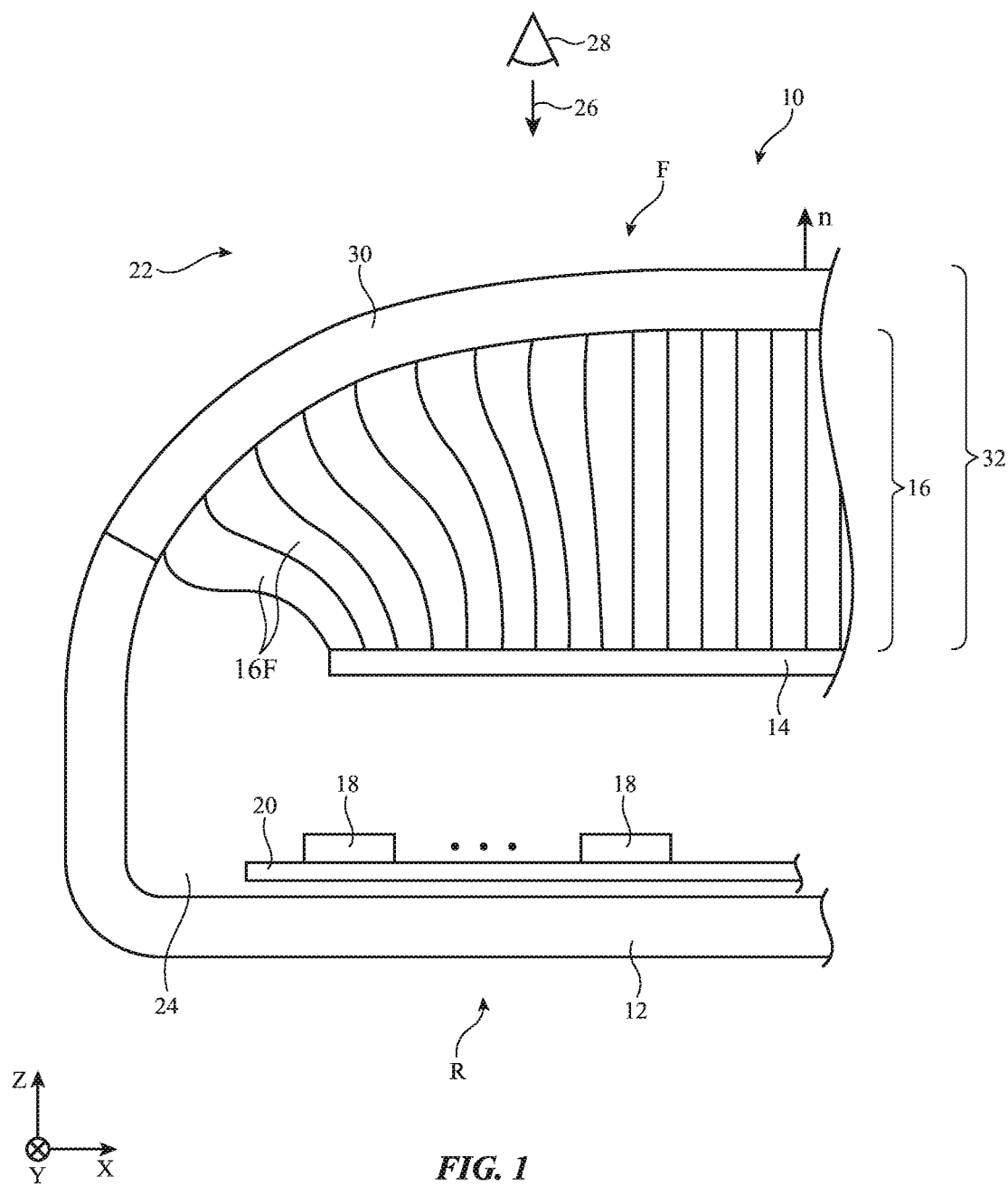
FIG. 1 is a side view of an illustrative electronic device with an image transport layer in accordance with an embodiment.

A cross-sectional side view of a portion of an illustrative electronic device with a display cover layer that includes an image transport layer is shown in FIG. 1. In the example of FIG. 1, device 10 is a portable device such as a cellular telephone, wristwatch, or tablet computer. In general, any type of electronic device may have an image transport layer such as a desktop computer, a voice-control speaker, a television or other non-portable display, a head-mounted device, an embedded system such as a system built into a vehicle or home, an electronic device accessory, and/or other electronic equipment.

Device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions such as interior region 24 and may separate interior region 24 from exterior region 22. In some configurations, an opening may be formed in housing 12 for a data port, a power port, to accommodate audio components, or to accommodate other devices. Clear housing regions may be used to form optical component windows. Dielectric housing structures may be used to form radio-transparent areas for antennas and wireless power components.

Electrical components 18 may be mounted in interior region 24. Electrical components 18 may include integrated circuits, discrete components, light-emitting components, sensors, and/or other circuits and may, if desired, be interconnected using signal paths in one or more printed circuits such as printed circuit 20. If desired, one or more portions of the housing walls may be transparent (e.g., so that light associated with an image on a display or other light-emitting or light-detecting component can pass between interior region 24 and exterior region 22).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14. The displays may, for example, include an organic light-emitting diode display, a liquid crystal display, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may have a polymer substrate that is sufficiently flexible to be bent. Display 14 may have a rectangular pixel array or a pixel array of another shape for displaying images for a user and may therefore sometimes be referred to as a pixel array. Display 14 may also sometimes be referred to as a display panel, display layer, or pixel layer. Each pixel array in device 10 may be mounted under a transparent housing structure (sometimes referred to as a transparent display cover layer).

In the example of FIG. 1, display (pixel array) 14 is mounted under display cover layer 32. Display cover layer 32 (which may be considered to form a portion of the housing of device 10), covers front face F of device 10. Configurations in which opposing rear face R of device 10 and/or sidewall portions of device 10 have transparent structures covering displays and other optical components may also be used.

As shown in FIG. 1, display cover layer 32 may include image transport layer 16 and protective layer 30. Protective layer 30 may be formed from a layer of glass, clear polymer, crystalline material such as sapphire or other crystalline material, and/or other transparent material. The presence of layer 30 may help protect the outer surface of layer 16 from scratches. If desired, layer 30 may be omitted (e.g., in configurations in which a thin-film protective coating is present on the outer surface of layer 16, in configurations in which layer 16 is formed from hard material such as glass, and/or in other configurations in which layer 16 is resistant to scratching). A layer of adhesive and/or other structures may be formed between protective layer 30 and image transport layer 16 and/or may be included elsewhere in the stack of layers on display 14.

During operation, the pixels of display 14 produce image light that passes through image transport layer 16. In configurations in which image transport layer 16 is formed from a coherent fiber bundle, image transport layer 16 has optical fibers 16F. The fibers or other optical structures of image transport layer structures such as image transport layer 16 transport light (e.g., image light and/or other light) from one surface (e.g., an input surface of layer 16 that faces display 14) to another (e.g., an output surface of layer 16 that faces viewer 28, who is viewing device 10 in direction 26). As the image presented to the input surface of layer 16 is transported to the output surface of layer 16, the integrity of the image light is preserved. This allows an image produced by an array of pixels to be transferred from an input surface of a first shape at a first location to an output surface with a different shape (e.g., a shape with a footprint that differs from that of the input surface, a shape with a curved cross-sectional profile, a shape with a region of compound curvature, and/or a shape with other desired features).

Image transport layer 16 may therefore move the location of an image and may optionally change the shape of the surface on which the image is presented. In effect, viewer 28 will view the image from display 14 as if the image were generated on the output surface of image transport layer 16. In arrangements in which the image from display 14 is warped (geometrically distorted) by image transport layer 16, digital pre-distortion techniques or other compensation techniques may be used to ensure that the final image viewed on the output surface of image transport layer 16 has a desired appearance. For example, the image on display 14 may be prewarped so that this prewarped image is warped by an equal and opposite amount upon passing through layer 16. In this way, the prewarped image is effectively unwarped by passage through layer 16 will not appear distorted on the output surface.

In configurations of the type shown in FIG. 1, device 10 may have four peripheral edges and a rectangular footprint when viewed in direction 26 or may have other suitable shapes. To help minimize the size of inactive display borders as a user is viewing front face F of device 10 as shown in FIG. 1, the shapes of fibers 16F along the periphery of layer 16 may be deformed outwardly as shown in FIG. 1. These fibers 16F each have an outwardly bent segment that bends away from surface normal n of the center of layer 30 (e.g., away from an axis parallel to the Z axis of FIG. 1) and each have an inwardly bent segment that bends back towards surface normal n to help direct output light towards viewer 28.

The deformed shapes of fibers 16F (and/or the corresponding deformations made to optical filaments in Anderson localization material in layer 16) may help distribute image light laterally outwards in the X-Y plane so that the effective size of display 14 is enlarged and the image produced by display 14 covers some or all of the sidewalls of housing 12 or other peripheral portions of device 10 when the image on front face F is being viewed by viewer 28. For example, the bent shapes of fibers 16F of FIG. 1 may help shift portion of the displayed image laterally outward in the X-Y plane along the edges and corners of device 10 to block the edges of device 10 from view. In some arrangements, the portions of fibers 16F at the outermost surface of layer 16 are oriented parallel or nearly parallel with viewing direction 26 and the Z axis of FIG. 1, which helps ensure that some or all of the light that has passed through layer 16 will travel in the Z direction and be viewable by viewer 28.

Figure 2:
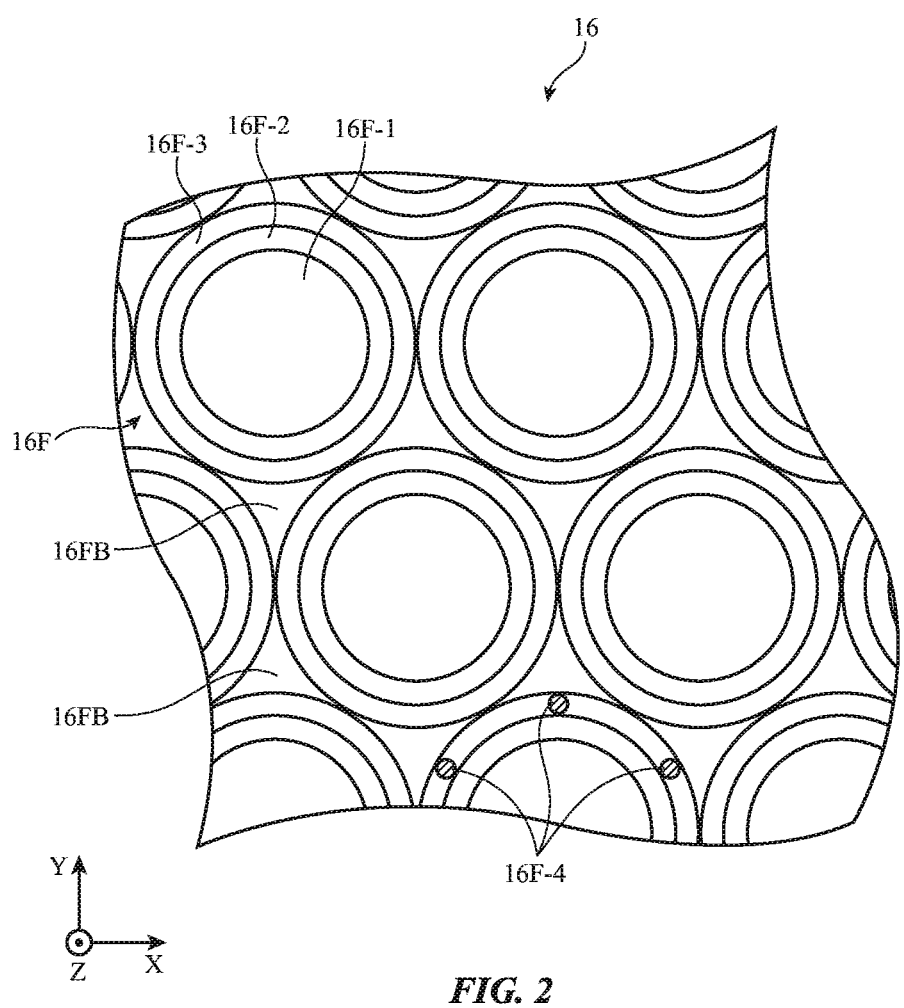
FIG. 2 is a cross-sectional view of a portion of an illustrative image transport layer formed using a coherent fiber bundle in accordance with an embodiment.

FIG. 2 is a cross-sectional view of a portion of image transport layer 16 in an illustrative configuration in which image transport layer 16 is formed from a coherent fiber bundle. Fibers 16F for layer 16 may have any suitable configuration. As shown in the example of FIG. 2, fibers 16F may each have a core such as core 16F-1. Cores 16F-1 and the other structures of image transport layer (e.g., cladding structures, binder, etc.) 16 may be formed from materials such as polymer, glass, crystalline material such as sapphire, and/or other materials. Some or all of these materials may be transparent. Arrangements in which some of the materials absorb light and/or have non-neutral colors or other light filtering properties may also be used.

Fiber cores 16F-1 may be formed from transparent material of a first refractive index and may be surrounded by cladding of a second, lower refractive index to promote light guiding in accordance with the principal of total internal reflection. In some arrangements, a single coating layer on cores 16F-1 may be used to form the cladding. In other arrangements, two or more coating layers on cores 16F-1 may be used to form the cladding. Clad fibers may be held together using binder 16FB, which serves to fill the interstitial spaces between the clad fibers. In some configurations, stray light absorbing material may be incorporated into layer 16 (e.g., into some of the cores, cladding, and/or binder). The stray light absorbing material may be, for example, polymer, glass, or other material into which light-absorbing material such as dye and/or pigment has been incorporated.

In an illustrative configuration, layer 16 may have inner coating layers 16F-2 that are formed directly on the outer surfaces of cores 16F-1 and outer coating layers 16F-3 that are formed directly on the outer surfaces of layers 16F-2. Additional coating layers (e.g., three or more coating layers) or fewer coating layers (e.g., a single coating layer) may be formed on fiber cores 16F-1, if desired. Stray light-absorbing material may be used in layers 16F-2 and/or 16F-3 or other coating layer(s) on cores 16F-1. In an illustrative arrangement, layers 16F-2 and 16F-3, which may sometimes be referred to as forming first and second cladding portions (or first and second claddings) of the claddings for fiber cores 16F-1, may respectively be formed from transparent material and stray light-absorbing material. Other arrangements may be used, if desired (e.g., arrangements in which stray light absorbing material is incorporated into some or all of binder 16FB, arrangements in which cores 16F-1 are coated with inner and outer transparent claddings and an interposed intermediate stray-light-absorbing cladding, arrangements in which cores 16F-1 are covered with a single stray-light-absorbing cladding, arrangements in which some or all of fibers 16F are provided with longitudinally extending filaments 16F-4 of stray light absorbing material located, for example, on or in any of the cladding layers, etc.).

In configuration in which fibers 16F have claddings formed from two or more separate cladding layers, the cladding layers may have the same index of refraction or the outermost layers may have lower refractive index values (as examples). Binder 16FB may have a refractive index equal to the refractive index of the cladding material or lower than the refractive index of the cladding material to promote total internal reflection (as examples). For example, each fiber core 16F-1 may have a first index of refraction and the cladding material surrounding that core may have a second index of refraction that is lower than the first index of refraction by an index difference of at least 0.05, at least 0.1, at least 0.15, at least 10%, at least 20%, less than 50%, less than 30%, or other suitable amount. The binder refractive index may be the same as that of some or all of the cladding material or may be lower than the lowest refractive index of the cladding by an index difference of at least 0.05, at least 0.1, at least 0.15, at least 10%, at least 20%, less than 50%, less than 30%, or other suitable amount.

The diameters of cores 16F-1 may be, for example, at least 5 microns, at least 7 microns, at least 8 microns, at least 9 microns, less than 40 microns, less than 17 microns, less than 14 microns, less than 11 microns, or other suitable diameter. Fibers 16F (including cores and claddings) may have diameters of at least 6 microns, at least 7 microns, at least 8 microns, at least 9 microns, less than 50 microns, less than 17 microns, less than 14 microns, less than 11 microns, or other suitable diameter.

Fibers 16F may generally extend parallel to each other in image transport layer 16 (e.g., the fibers may run next to each other along the direction of light propagation through the fiber bundle). This allows image light or other light that is presented at the input surface to layer 16 to be conveyed to the output surface of layer 16.

If desired, image transport layer 16 may be formed from Anderson localization material in addition to or instead of fibers 16F. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Figure 3:
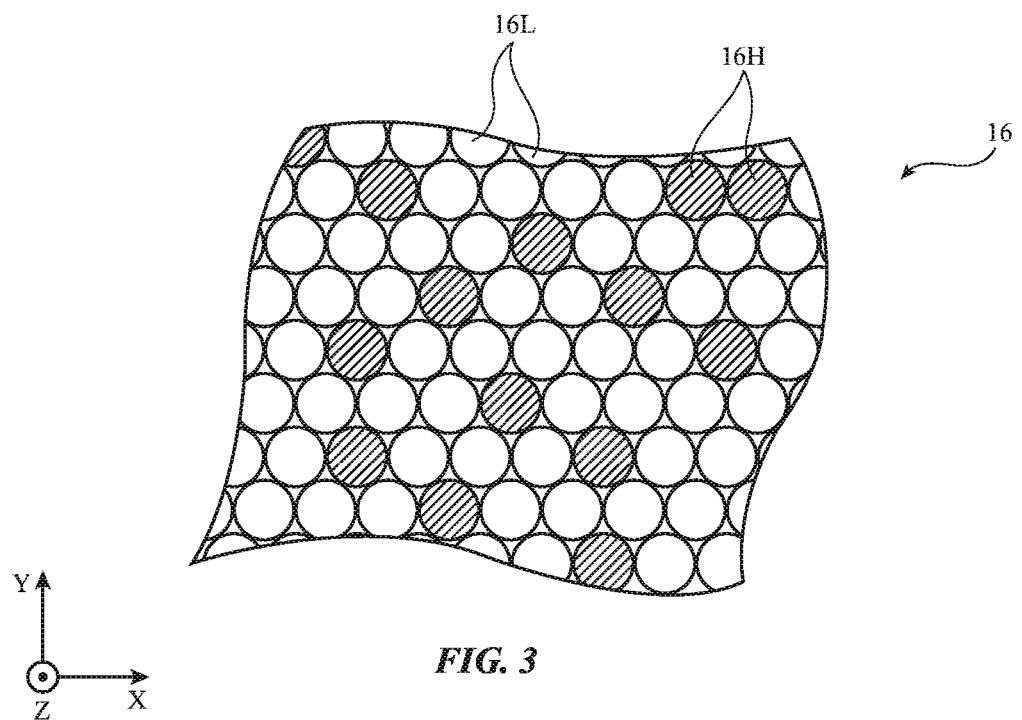
FIG. 3 is a cross-sectional view of a portion of an illustrative image transport layer formed using Anderson localization material in accordance with an embodiment.

FIG. 3 is a cross-sectional view of a portion of an image transport layer formed from Anderson localization material. In the example of FIG. 3, image transport layer 16 includes a random (pseudorandom) set of elongated optical structures of different refractive index values. These structures may, for example, be optical filaments that run into and out of the page of FIG. 3 and that have different refractive index values such as first filaments 16H with higher refractive index values and second filaments 16L with lower refractive index values. The refractive indices of filaments 16L and 16H may differ by any suitable amount (e.g., by at least 0.05, at least 0.1, at least 0.2, at least 0.3, by less than 0.8, etc.). The filaments may be distributed laterally (in dimensions X and Y) with a random pattern and may have any suitable cross-sectional shape (circular, rectangular, etc.). Anderson localization material preforms can be formed by drawing and assembling individual filaments of different refractive index values into bundles and/or can be formed by extruding lengths of material that include laterally interspersed areas of different respective refractive index values. Preforms can then be formed into layer 16 using one or more fusing and drawing operations. Other fabrication techniques may be used, if desired. To absorb stray light within an image transport layer formed from Anderson localization material, the Anderson localization material may include light absorbing material (e.g., light-absorbing filaments interspersed with transparent filaments or other light-absorbing structures).

Figure 4:
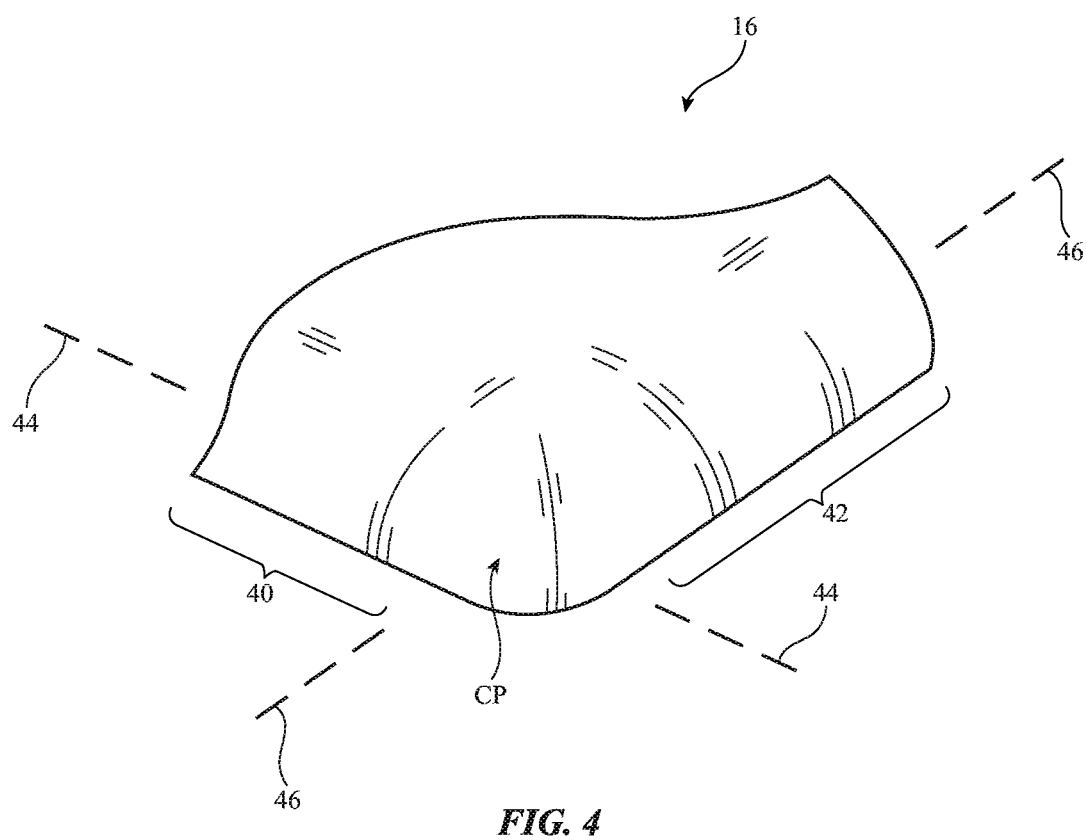
FIG. 4 is a perspective view of a portion of an image transport layer surface with compound curvature in accordance with an embodiment.

Image transport layers can be used to transport an image from a first surface (e.g., the surface of a pixel array) to a second surface (e.g., a surface in device 10 with compound curvature or other curved and/or planar surface shape) while preserving the integrity of the image. A perspective view of an illustrative corner portion of image transport layer 16 is shown in FIG. 4. In the example of FIG. 4, device 10 has edge portions 40 and 42 with surfaces that curve about axes 44 and 46, respectively. These portions of layer 16 may extend parallel to the straight sides of device 10 (as an example) and are characterized by curved surfaces that can be flattened into a plane without distortion (sometimes referred to as developable surfaces). At the corner of image transport layer 16 of FIG. 4, image transport layer 16 has curved surface portions CP with compound curvature (e.g., a surface that can only be flattened into a plane with distortion, sometimes referred to as a surface with Gaussian curvature). In a rectangular layout with curved corners, image transport layer 16 may have four corners with compound curvature. Image transport layers of other shapes (e.g., circular outlines, etc.) may also have surfaces with compound curvature (e.g., dome-shaped surfaces). When overlapped by protective layer 30, the overlapping portions of protective layer 30 may have corresponding surfaces with compound curvature. When selecting the size and shape of the output surface of layer 16 and therefore the size and shape of the image presented on the output surface, the use of an image transport layer material with compound curvature can provide design flexibility.

Figure 5:
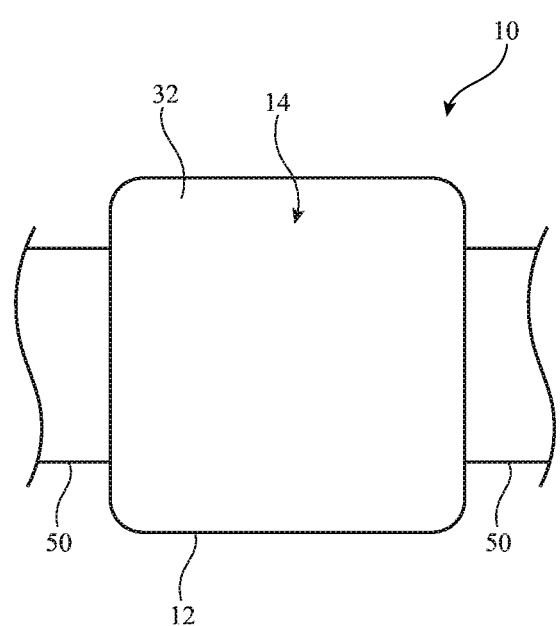
FIG. 5 is a top view of an illustrative electronic device in accordance with an embodiment.

In some arrangements, device 10 may include support structures such as wearable support structures. This allows device 10 to be worn on a body part of a user (e.g., the user's wrist, arm, head, leg, or other portion of the user's body). As an example, device 10 may include a wearable band, such as band 50 of FIG. 5. Band 50, which may sometimes be referred to as a wristband, wrist strap, or wristwatch band, may be formed from polymer, metal, fabric, leather or other natural materials, and/or other material, may have links, may stretch, may be attached to housing 12 in a fixed arrangement, may be detachably coupled to housing 12, may have a single segment or multiple segments joined by a clasp, and/or may have other features that facilitate the wearing of device 10 on a user's wrist.

Figure 6:
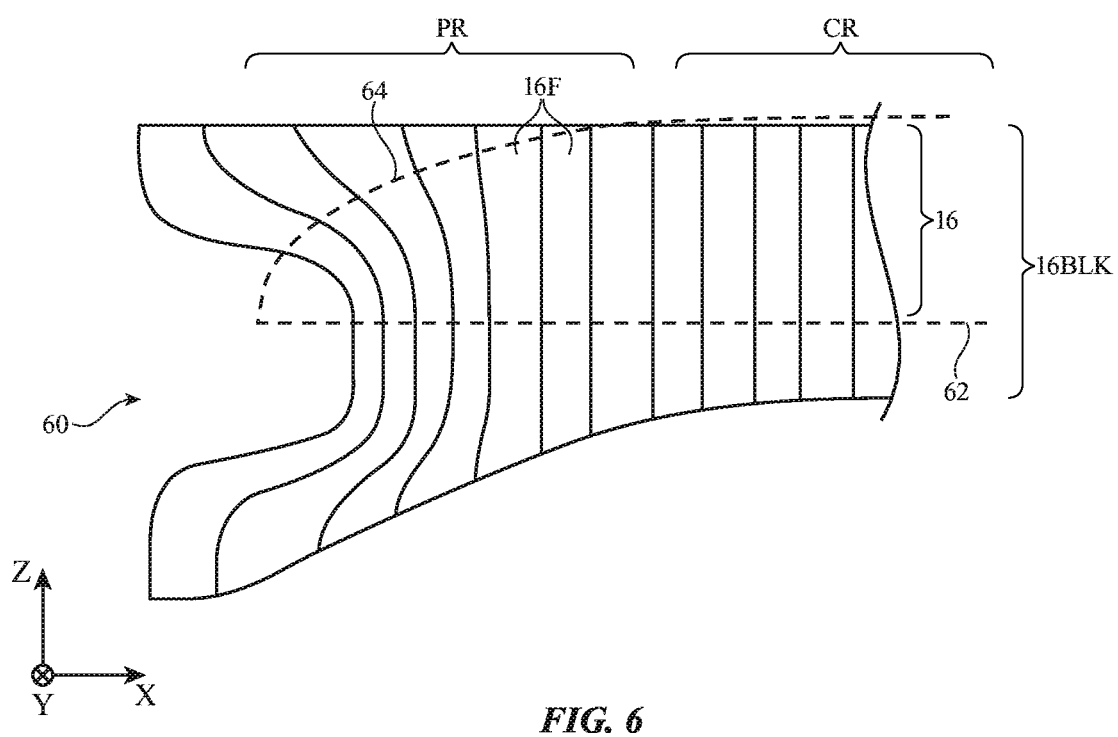
FIG. 6 is a side view of an illustrative image transport layer in accordance with an embodiment.

Image transport layers may be formed by molding or otherwise processing blocks of image transport layer material (e.g., blocks of coherent fiber bundle material or Anderson localization material). Consider, as an example, the image transport layer structure of FIG. 6. As shown in FIG. 6, image transport layer 16 of FIG. 6 is being formed from a block of image transport layer material (block 16BLK). Block 16BLK originally had fibers 16F (or Anderson localization material) oriented parallel to the Z axis. During fabrication, a heated mold is used to apply pressure to region 60 around the perimeter of block 16BLK. The resulting indentation in the side of block 16BLK helps bend fibers 16F into desired orientations. Sawing, grinding, and polishing operations may then be used to form block 16BLK into image transport layer 16. For example, block 16BLK may be cut (e.g., with a saw) along dashed line 62 to form an input surface for layer 16. Corresponding output surface 64 may be formed by cutting (e.g., with a saw), grinding, polishing, etc. to from an output surface for layer 16 that has a planar central portion CR and a curved edge portion PR. An image transport layer with this shape (e.g., a planar central region and a peripheral portion having a curved output surface) may be used in electronic device 10 of FIG. 1 (as an example).

The portion of image transport layer 16 that is located in the periphery of device 10 (e.g., peripheral image transport layer portion PR) and the portion of image transport layer 16 that is located in the center of device 10 (e.g., center portion CR) may have different amounts of deformation. For example, in forming peripheral portion PR, the output surface in portion PR may be laterally stretched. This stretching may affect the fibers in portion PR. For example, image intensity may be reduced due to the increase in surface area associated with portion PR, light scattering may be increased due to stress and defects, the numerical aperture of fibers 16F may be affected by changes to the shape and size of fibers 16F and/or binder 16FB, the angle at which light is emitted may be different in peripheral portion PR than in central portion CR, and other aspects of the optical performance of layer 16 may be affected. The process of bending fibers 16F in portion PR may create extra stress in portion PR relative to portion CR. If care is not taken, the periphery of image transport layer 16 may exhibit excessive light scattering and associated reductions in image quality and/or may be physically weaker than other portions of layer 16.

Figure 7:
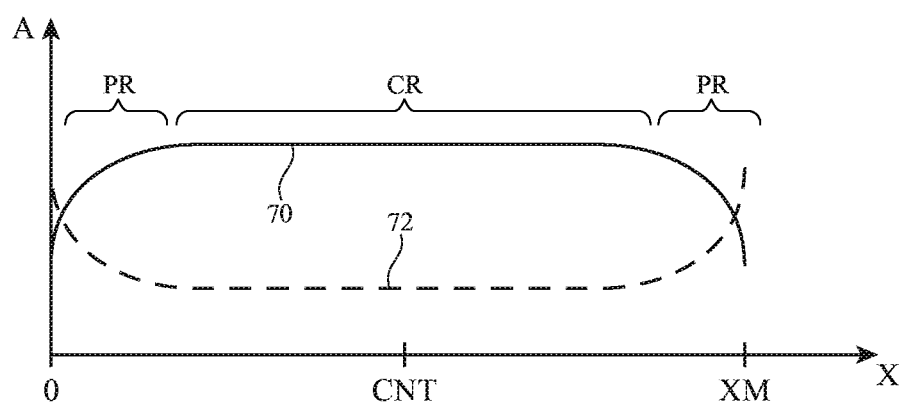
FIG. 7 is a graph showing how properties of an image transport layer may be varied as a function of lateral position across the image transport layer.
Figure 8:
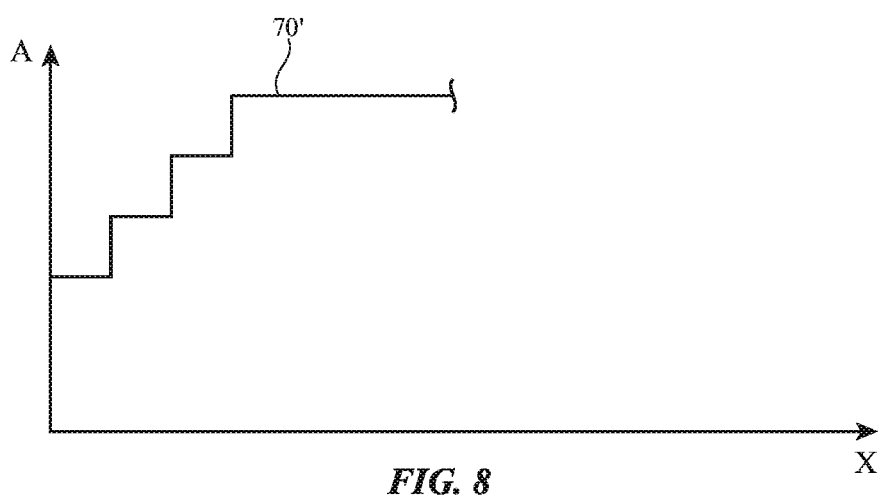
FIG. 8 shows how a property of an image transport layer may be varied in a stepwise fashion as a function of lateral position in accordance with an embodiment.

To help moderate these undesired qualities, the optical and/or physical properties of layer 16 can be varied as a function of position within layer 16. As an example, a property A may be varied as a function of lateral distance X (and/or lateral distance Y, if desired), as illustrated by curves 70 and 72 in the graph of FIG. 7. In the example of FIG. 7, image transport layer 16 has a first edge (e.g., a left-hand side) located at X=0 and has an opposing second edge (e.g., a right-hand side) located at X=XM. As shown by curve 70, property A may be constant in center portion CR of image transport layer 16 and may have reduced values in edge portions PR. Property A may decrease smoothly as a function of increasing distance away from center CNT of image transport layer 16 and portion CR toward the peripheral edge of layer 16 or, as shown by curve 70' of FIG. 8, property A may be varied in a step-wise fashion (e.g., by assembling layer 16 from bundles of fibers (canes), where each bundle potentially has a different value of property A).

As shown by line 72 in the graphs of FIG. 7, property A may be increased at increasing distances away from center CNT. Configurations in which property A exhibits local minimums and maximums as a function of lateral position in layer 16 may also be used. Properties such as property A may vary as a function of lateral position in layer 16 before and/or after layer 16 is processed by molding, sawing, grinding, polishing, and/or other processing operations. For example, property A may be decrease at increasing distances from center CNT before molding and other shaping operations and may be constant or may increase at increasing distances from center CNT after molding and other shaping operations.

Any one or more properties such as illustrative property A may be varied in image transport layer 16 as a function of lateral position within layer 16 (and, if desired, as a function of depth below the exterior surfaces of layer 16, etc.). Examples of properties that may be varied include the diameter of fiber cores 16-1, the numbers, thicknesses, and optical absorption properties of cladding layers such as illustrative cladding layers 16-2 and 16-3, the binder fraction of binder 16FB, the materials used in forming fiber cores, cladding, and/or binder for layer 16, the absorption, transmission, and/or reflection of the material used for the fiber cores, claddings, and/or binder at various wavelengths (e., at red wavelengths, green wavelengths, blue wavelengths and/or other visible light wavelengths, at infrared wavelengths, at ultraviolet wavelengths, etc.), the modulus of elasticity of the material used for the fiber cores, claddings, and/or binder in layer 16 (e.g., whether one or more of these materials is rigid or is flexible), the refractive index values of the materials used for the cores, cladding, and binder, the chemical composition of the materials used for the cores, cladding, and/or binder (e.g., whether glass, polymer, or other materials are used), the haze of the fiber cores, cladding, and/or binder. The thickness of a light-absorbing cladding layer(s) relative to the thickness of a transparent cladding layer may be varied. Additional properties that can be varied include the opacity of a light-absorbing material used in cores, cladding, and/or binder, the shape of fiber cores, cladding, and/or binder, the homogeneity of the fiber cores, cladding, and/or binder (e.g., whether a single material is used for the cores or whether different types of materials are used, whether binder is formed from a clear polymer or glass or is formed from Anderson localization material, the amount of tensile and/or compressive stress imparted on layer 16 at a given location, the inclusion and/or configuration of light-absorbing filaments such as filaments 16F-4, etc.).

Any one or more of these properties can be decreased and/or increased as a function of location within layer 16, as illustrated by the adjustments made to property A in the example of FIG. 7. As an example, more light-absorbing structures (e.g., light-absorbing cladding, light-absorbing filaments, etc.) and/or light-absorbing material of enhanced opacity, may be incorporated into peripheral edge portions PR than in central portion CR to help reduce stray light from scattering, which is more prevalent in edge portions PR than central portion CR. As another example, because device 10 may be dropped on its side, it may be desirable to use softer binder 16FB (binder with a lower modulus of elasticity) in edge portions PR than in central portion CR, as this may enhance the ability of edge portion PR to absorb shocks and/or may reduce built-in stress). To reduce light scattering, it may be desirable to lower the refractive index of binder 16FB selectively in edge portions PR and/or fiber cores of increased refractive index (e.g., to enhance total internal reflection in fibers near edge portions PR). Other sets of one or more, two or more, or three or more attributes of image transport layer 16 may be varied as a function of lateral position within layer 16 (or as a function of other placement within layer 16), if desired. The foregoing examples of attributes that can be varied are illustrative.

Image transport layer 16 may, if desired, be assembled from multiple smaller coherent fiber bundles. These smaller fiber bundles, which may sometimes be referred to as canes, fiber bundles, rods, or image transfer layer sub-blocks, may have hexagonal cross-sectional shapes, rectangular cross-sectional shapes, or other suitable shapes. Fusing operations and/or other fiber cane assembly operations may be used to form a block of image transport layer material from individual canes.

Figure 9:
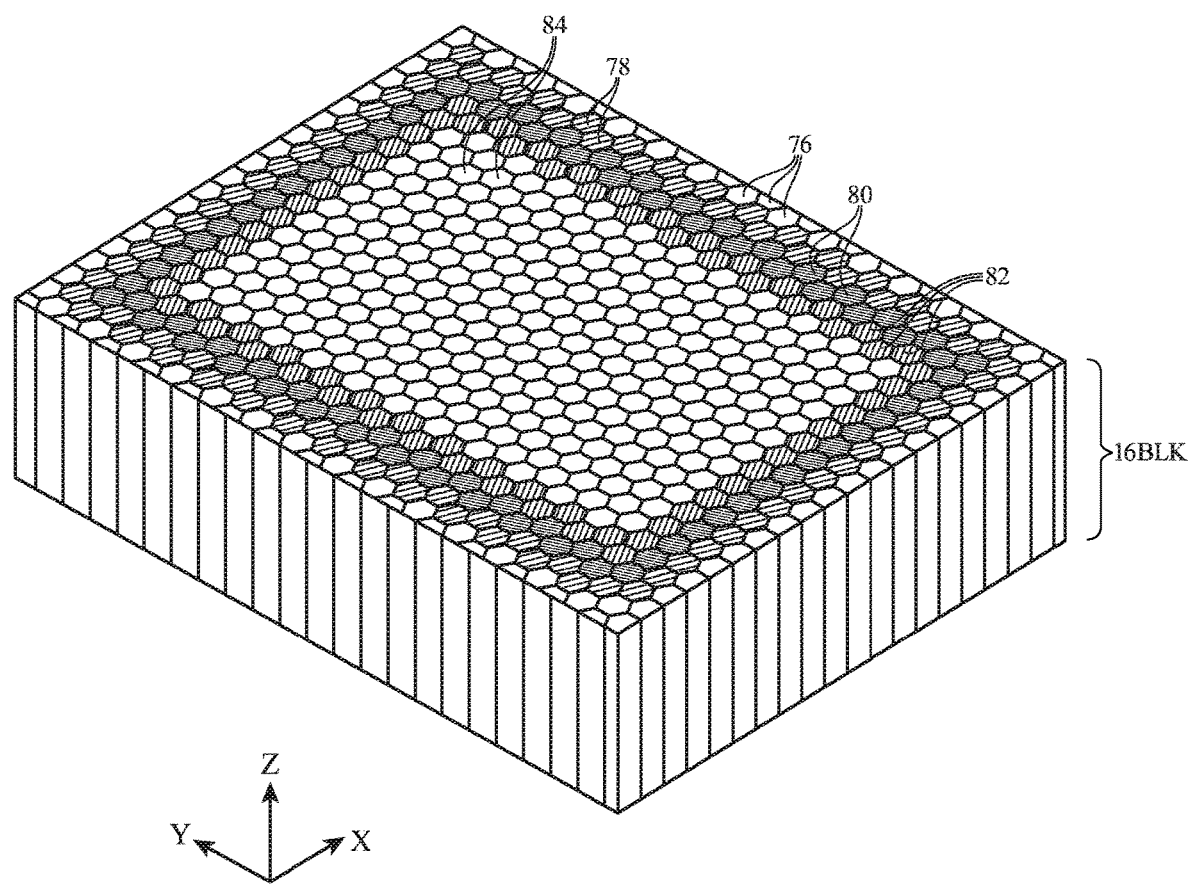
FIG. 9 is a perspective view of an illustrative block of image transport layer material having small fiber bundles (canes) with properties that vary as a function of lateral position within the block in accordance with an embodiment.

When forming canes from fibers 16F, each cane may potentially have different material and/or different fiber attributes. Consider, as an example, the arrangement shown in FIG. 9. In the example of FIG. 9, an image transport layer block 16BLK has been formed by assembling multiple hexagonal canes each of which contains a hexagonal coherent fiber bundle with one or more potentially different attributes (e.g., different materials for fiber cores, cladding, and/or binder, different numbers of cladding layers, different diameters for the cores, different binder fractions for the binder, different refractive index values, modulus of elasticity values, different colors, different opacities, etc.). This allows the properties of block 16BLK (and the image transport layer 16 that is formed from block 16BLK) to be varied as a function of lateral position (in the X-Y plane).

As shown in FIG. 9, for example, the central (rectangular) portion of block 16BLK may have canes 84 with a first set of properties. This may be surrounded by an inner ring (e.g., a rectangular ring) of canes 82 with a potentially different set of properties. Successive rings of canes such as canes 80, 78, and 76 may be provided respectively around canes 82, each of which may have one or more properties that differ from one or more of the properties of a previous respective (more inwardly located) ring of canes. The canes may be any suitable size (e.g., the smallest lateral dimension of each cane may be less than 20%, less than 10%, less than 3%, or less than 0.5% of the smallest lateral dimension of layer 16 (as examples). As canes become small, the step size of the steps in curve 70' of FIG. 8 tend to become negligible and parameter A can be considered to have a smoothly varying configuration as illustrated by the curves of FIG. 7.

Figure 10:
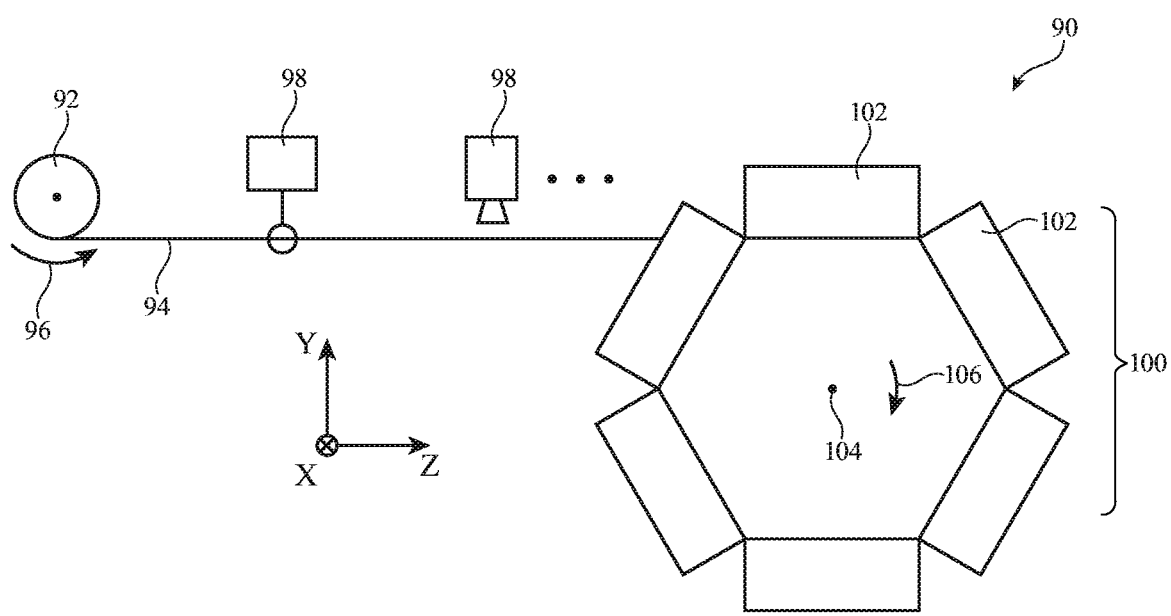
FIG. 10 is a diagram of illustrative equipment being used to produce image transport layer material with a property that varies as a function of lateral position in accordance with an embodiment.

If desired, parameter A can be controlled during assembly of a block of image transport layer material. This type of arrangement is shown in FIG. 10. As shown in FIG. 10, fiber source 92 of system 90 may supply fiber 94 in direction 96. Take up wheel 100 may rotate about axle 104 in direction 106. As wheel 100 rotates, blocks of fiber 94 may be formed within guides (e.g., U-shaped guides) such as channels 102 on the circumference of wheel 100. During the process of placing fiber 94 into channels 102, tools 98 may modify the lateral location and attributes of fiber 94. Tools 98 may include, for example, a computer-controlled positioner that controls the lateral location of fiber 94 (e.g., the location of fiber 94 in the X and Y direction) within the block of image transport layer material that is formed within each channel 102. During the process of laying fiber 94 into each channel 102, the positioner may, for example, repeatedly move fiber 94 back and forth along the X axis, allowing the thickness of the fiber layers in the channel to be built up with successive revolutions of wheel 100. Additional tools 98 may adjust the attributes of fiber 94. For example, different types of coatings may be applied to fiber 94 depending on the current dispensing location of fiber 94, different thermal treatments may be applied (e.g., to locally thin fiber 94, to cure coating material, etc.), different types and amount of light may be applied (e.g., for varying polymer curing), different amounts of tension may be applied, different types and amounts of cladding and/or binder may be applied, different additives used (e.g., colorants such as dyes and/or pigments, conductive particles, infrared-light-blocking particles or other infrared light-blocking material, visible-light-blocking particles or other visible light-blocking material, and/or ultraviolet-light-blocking particles or other ultraviolet light-blocking material), different chemicals may be applied, different amounts of conductive material may be applied, etc. As an example, a spray coating apparatus may dispense a cladding that is transparent whenever fiber 94 is being dispensed into the center of a fiber block and may dispense a cladding that is light absorbing (e.g., black, gray, etc.) whenever fiber 94 is being disponed near in a peripheral portion of the block. As another example, a fiber coating apparatus may apply binder with a lower elasticity when winding onto peripheral portions of the block than when winding onto central portion of the block. The blocks wound onto channels 102 can then be further processed (e.g., by molding, machining, etc.) to form image transport layers 16 for devices 10. Because the attributes of fiber 94 (core, cladding, and/or binder dimensions and/or materials) can vary as a function of lateral position within the blocks of fiber material being wound onto wheel 100, the image transport layers 16 formed from these blocks can also be varied as a function of lateral position within layers 16.

Varying the properties of individual canes of image transport layer material and/or individual fibers that are used (e.g., by varying one or more of the size, shape, and/or material used for fiber cores, claddings, and binder), produces a block of image transport layer material with properties that vary across its lateral dimensions. This allows image transport layer 16 to have desired properties at different lateral locations across layer 16 (e.g., across the output surface of layer 16, etc.).

As an example, the stiffness (elastic modulus) of the material forming the image transport layer block can be varied so as to become more elastic (lower modulus) near the periphery of the block. When the block of material is sliced, molded, ground, and polished and/or otherwise formed into a final shape for image transport layer 16, the peripheral portions tend to be subjected to more stretching and stress buildup than the central portion. By using lower elasticity structures for the peripheral portion, the amount of lateral expansion of the output surface and/or other portions of the image transport layer can be smoothly distributed across the output surface of the image transport layer. For example, the block of material may have a smoothly (or stepwise) decreasing elasticity at increasing distances from the center of an image transport layer block. Excessive localized stress buildup may therefore be moderated.

Following molding and shaping of a portion of the block to form image transport layer 16, the expansion of the output surface of layer 16 and/or other portions of layer 16 can be smoothly distributed across the surface of layer 16 (e.g., abrupt and potentially excessive expansion can be avoided along the outermost edge of layer 16). This may help enhance the strength and optical performance of layer 16. The modulus of elasticity may be lowered in this way in the periphery of layer 16 by incorporating more elastic binder in the periphery, by lowering the elasticity of fiber cladding material, by changing the binder fraction (e.g., by increasing binder fraction in a scenario in which the binder has a lower elastic modulus than the core and cladding), and/or by otherwise adjusting the stiffness of the image transport layer material as a function of lateral position. Elasticity may be decreased in the periphery relative to the center of layer 16, may be increased in the periphery relative to the center, may change progressively (up or down) as a function of increasing lateral distance from the center, and/or may change in a stepwise fashion (up or down) as a function of increasing lateral distance from the center (as examples).

As another example, the peripheral portion of the image transport layer may tend to have more light scattering do to the extra deformation of the peripheral portion of the image transport layer (e.g., during molding, etc.). To accommodate this light scattering while ensuring that the overall appearance of the outer surface of the mage transport layer is satisfactory in its final form, the block of image transport layer material may be provided with more light-absorbing material (e.g., cladding, binder, and/or other material with greater light absorption, etc.) in the peripheral region than the center. In the finished image transport layer, the additional light-absorption of the peripheral portion may help to suppress stray light in the peripheral portion.

Figure 11:
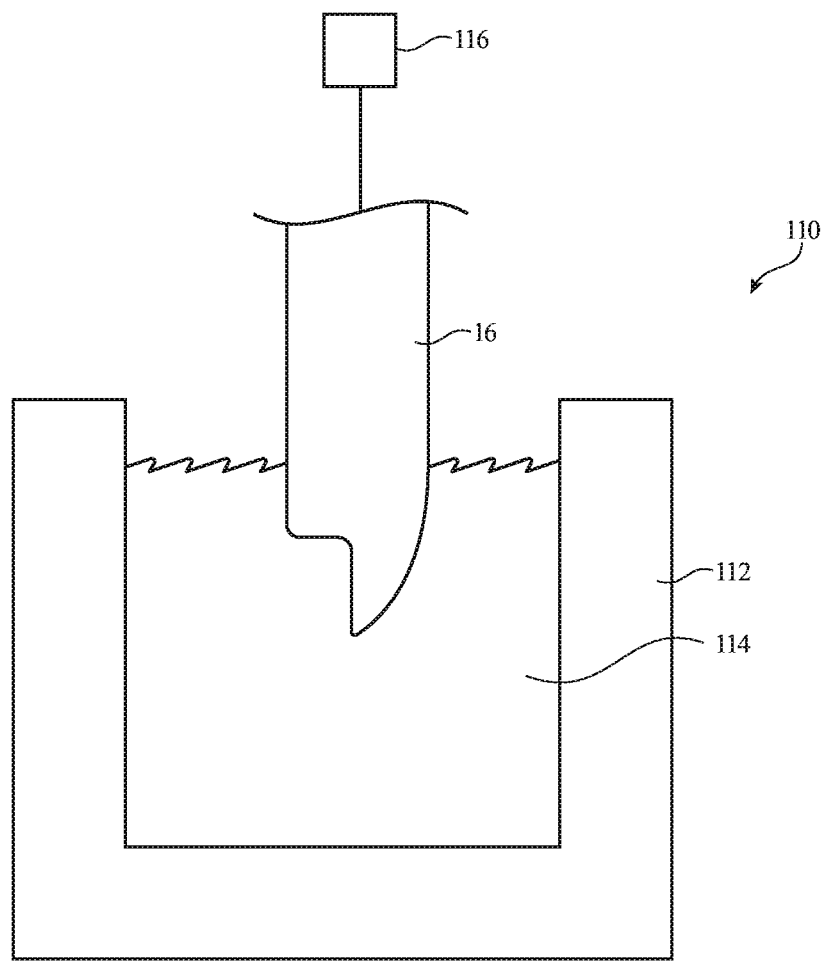
FIG. 11 is a cross-sectional side view of an illustrative system in which an image transport layer is being treated in a liquid bath in accordance with an embodiment.

In some arrangements, the properties of layer 16 can be adjusted after initial processing of a bundle of fibers and/or Anderson localization material to form an image transport layer of a desired shape. Consider, as an example, the treatment bath system of FIG. 11. System 100 includes receptacle 112 in which liquid treatment bath 114 is contained. Bath 114 may be an acid for etching fiber core material, chemicals for selectively incorporating (e.g., doping) cladding or other material with light-absorbing substances (e.g., selectively doping the periphery of layer 16 with light-absorbing material such as light-absorbing material in fiber cladding to help absorb stray light), may include other liquid chemicals for treating fibers, fiber cladding material, and/or fiber binder (as an example), and/or may include other material.

Computer controlled positioner 116 may control immersion of image transport layer 16 in bath 114 (e.g., so that the peripheral portions of layer 16 are exposed more or less than the center of layer 16, so that some portions of layer 16 are dipped in bath 114 whereas other portions of layer 16 are not dipped in bath 114, so that the exposure of layer 16 to bath 114 is slowly varied as a function of lateral position across layer 16, so that only peripheral portions PR are exposed to bath 114, etc.). Bath 114 may be used to soften peripheral portions of layer 16, to strengthen peripheral portions of layer 16, to relieve stress in peripheral portions of layer 16 after molding operations impart stress to the periphery of layer 16, to selectively remove binder in peripheral portions, to selectively add light-absorbing material (e.g., to areas of selectively removed binder), to selectively apply paint (e.g., colored polymer), etc.

If desired, layer 16 may be provided with a mask before exposure to bath 114. For example, polymer or other masking material may be patterned onto the surface of layer 16 before some or all of layer 16 is immersed in bath 114. The masking material may, as an example, expose only peripheral portions of layer 16 while protecting the central regions of layer 16). Following exposure of the peripheral portions of layer 16 to bath 114, the masking material may be stripped.

The use of treatment bath 114 may tend to cause variations in the properties of layer 16 as a function of distance from the surface of layer 16 (e.g., the output surface and/or the input surface) into the bulk of layer 16. When only peripheral portions of layer 16 are treated (or when these peripheral portions are treated differently), properties may also be varied as a function of lateral position in layer 16.

Figure 12:
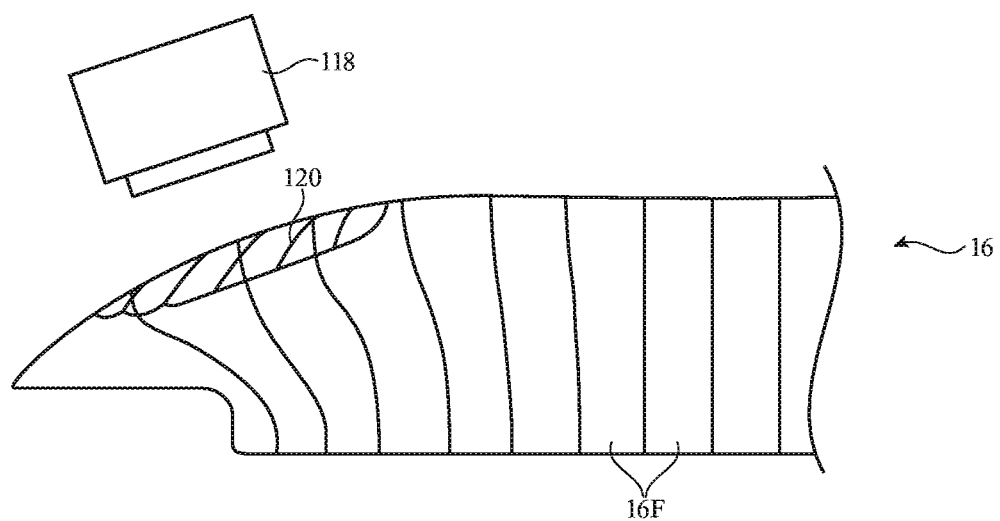
FIG. 12 is a cross-sectional side view of a processing tool that is selectively processing a portion of an image transport layer such as a peripheral portion of the output surface of an image transport layer so that a property of the layer is varied as a function of distance into the layer from the output surface in accordance with an embodiment.

As shown in the illustrative arrangement of FIG. 12, a processing system may have one or more tools such as tool 118 to apply energy (radio-frequency signals, light, static electric fields, heat, etc.), to apply particles (e.g., to implant ions with an ion implanter, to chemically strengthen glass via ion exchange), to apply chemicals (e.g., via spraying, ink-jet printing, etc.), and/or to perform other processing tasks to some or all of the surface of layer 16. If desired, tool 118 may, for example, apply more heat or light to peripheral regions PR of layer 16 than to central regions CR, thereby changing the properties of layer 16 in peripheral region PR relative to central portion CR (e.g., to selectively darken cladding material to enhance stray light absorption in peripheral region PR relative to central portion CR). Coatings that have different colors and/or other optical properties (haze, refractive index, light absorption, transmission, reflection, and/or absorption characteristics over wavelength, etc.), physical properties (scratch resistance, oil repellency, water repellency, hardness, stiffness, elastic modulus, chemical makeup, etc.), and/or electrical or other properties (e.g., conductivity, radio-transparency, etc.).

The application of energy or substances to layer 16 and/or other processes performed on the fibers and/or Anderson localization material of layer 16 during processing to form layer 16 of device 10 may result in attributes that vary as a function of depth from the surface of layer 16 into the bulk of layer 16 in addition to and/or instead of varying as a function of lateral position within layer 16. For example, processed portion 120 of layer 16 may be located near the output surface of layer 16. Further into layer 16 from the output surface of layer 16, layer 16 may remain unprocessed. For example, in processed portion 120 at the surface of layer 16, layer 16 may be more opaque than at larger distances into layer 16 from the output surface of layer 16.

As these examples demonstrate, one or more attributes of layer 16 (e.g., one or more properties such as illustrative property A) may be varied as a function of position within layer 16 (e.g., lateral position and/or depth into layer 16 from a surface). FIG. 13-17 are top views of illustrative image transport layers for device 10 that have different illustrative patterns in which one or more properties such as property A have been varied as a function of lateral position and, if desired, as a function of depth in layer 16.

Figure 13:
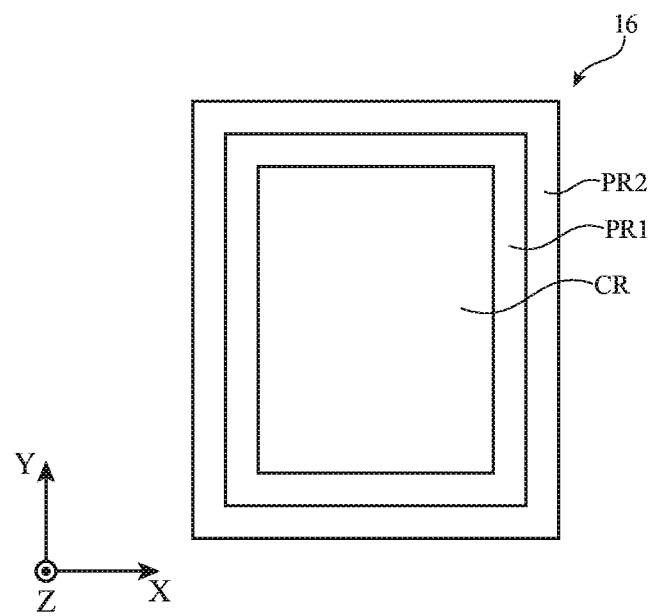
FIG. 13 is a top view of an illustrative image transport layer having concentric rings of image transport layer material with different respective properties.

As shown in the example of FIG. 13, the central region of layer 16 formed from central portion CR may be surrounded on all sides by a peripheral portion with one or more varied properties. In general, central portion CR may have any suitable shape (footprint when viewed from above) such as a square shape, an elongated rectangular shape, a shape with curved and/or straight edges, a circular shape, etc.). The surrounding peripheral portion may surround portion CR as shown in FIG. 13. The peripheral portion may have one or more attributes that vary smoothly and continuously with increasing lateral distance from the center of layer 16 or may have one or more attributes that vary in a stepwise fashion as a function of lateral distance through the peripheral portion.

In the example of FIG. 13, central portion CR is surrounded by a first ring-shaped peripheral portion PR1. A second ring-shaped peripheral portion PR2 (and, if desired, additional ring-shaped structures or other peripheral structures) may surround ring PR1.

Figure 14:
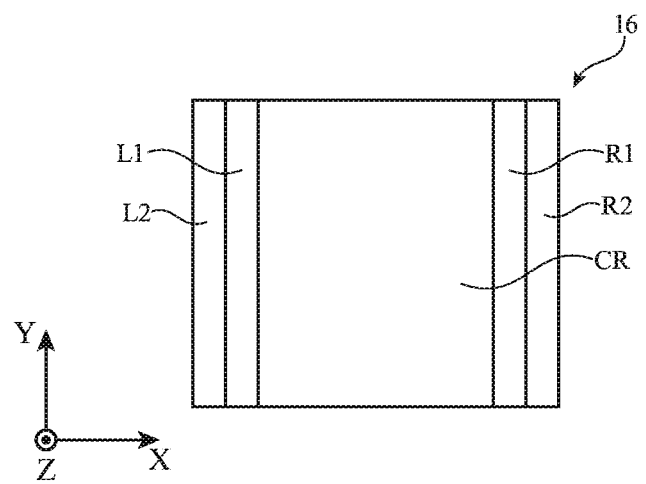
FIG. 14 is a top view of an illustrative image transport layer having strip-shaped regions with different properties in accordance with an embodiment.

In the example of FIG. 14, only the opposing left and right peripheral portions of layer 16 differ from central region 14. In this type of arrangement, there may be one or more peripheral strips of peripheral image transport layer material with different respective properties that run along the left peripheral edge of layer 16 and one or more peripheral strips of peripheral image transport layer material that run along the right peripheral edge of layer 16 (e.g., strips L1 and L2 on the left and strips R1 and R2 on the right in this example). These strips may be straight strips or may have other elongated shapes that do not surround central portion CR. There may be one or more, two or more, three or more, or more than four strips on each edge of portion CR with different respective properties and/or the peripheral portion of layer 16 may have one or more properties that vary continuously as a function of lateral position in layer 16.

Figure 15:
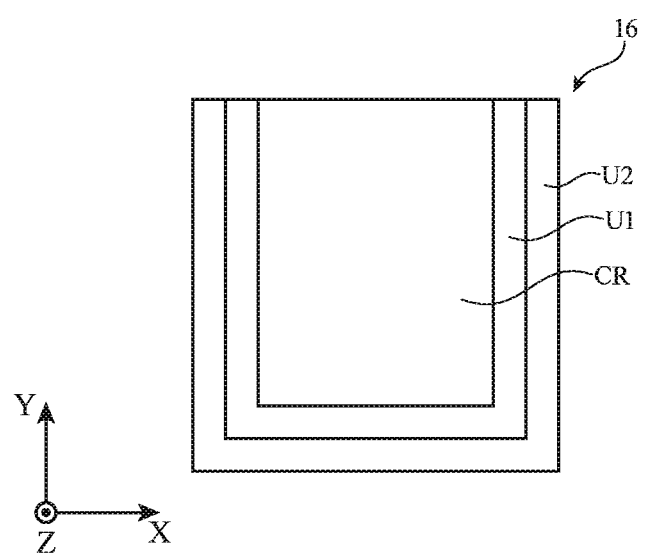
FIG. 15 is a top view of an illustrative image transport layer having U-shaped strips of material with different properties in accordance with an embodiment.

FIG. 15 shows how layer 16 may have one or more U-shaped peripheral strips (e.g., in an arrangement in which central portion CR has a rectangular shape). For example, first U-shaped strip U1 may have one or more properties that differ from those of central portion CR. These properties may be different in one or more additional U-shaped peripheral strips (see, e.g., strip U2) and/or peripheral image transport layer properties may vary continuously within U-shaped peripheral areas as a function of lateral position.

Figure 16:
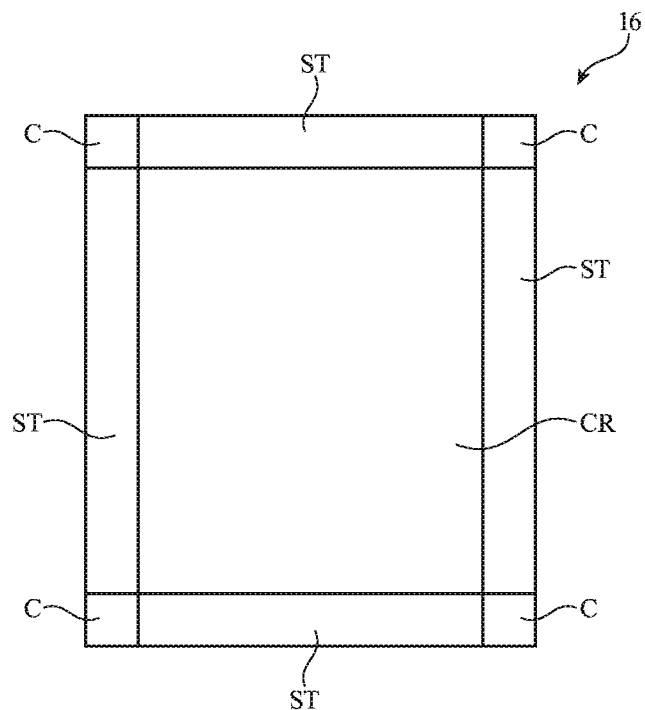
FIG. 16 is a top view of an illustrative image transport layer with corners having different properties than a central portion of the layer in accordance with an embodiment.

In the example of FIG. 16, corner portions C of layer 16 have different properties (e.g., enhanced light absorption and/or lower elastic modulus for some or all of fiber core structures, cladding structures, and/or binder structures) than center portion CR. Strip-shaped edge portions ST may also have different properties than portion CR and/or than corner portions C.

Figure 17:
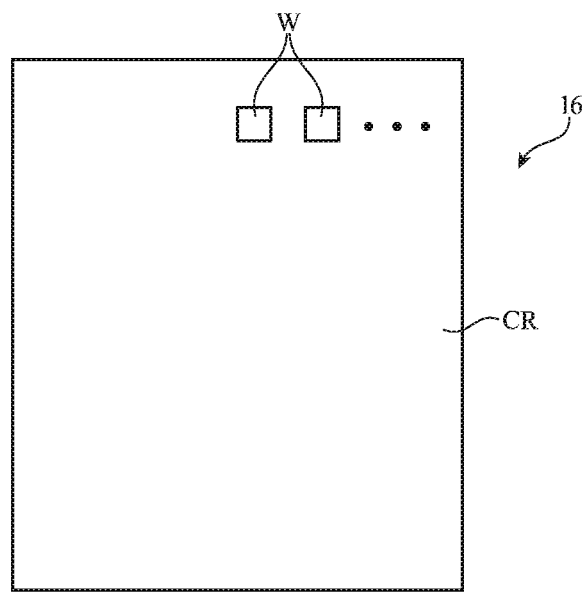
FIG. 17 is a top view of an illustrative image transport layer having one or more window portions that have properties that vary from the surrounding portion of the image transport layer in accordance with an embodiment.

FIG. 17 is a top view of an illustrative image transport layer having one or more window portions (windows W) that have properties that vary from the surrounding portion of image transport layer 16. To facilitate operation of a two-dimensional capacitive touch sensor that is incorporated into display 14 and/or that is formed from a touch panel that overlaps display 14, image transport layer 16 may include conductive structures (e.g., conductive filaments, conductive coating layers, conductive particles in fiber cores, cladding, and/or binder, etc.). These conductive structures may provide layer 16 with sufficient conductivity that a touch sensor associated with display 14 can operate through layer 16, even in scenarios in which layer 16 is relatively thick. To ensure that radio-frequency components such as radio-frequency antennas, radio-frequency sensors, and/or other radio-frequency components can operated through image transport layer 16, one or more radio-transparent windows W may be formed in layer 16. A radio-transparent window W may, for example, have no conductive structures or may have fewer conductive structures than surrounding portions of layer 16, thereby helping to ensure that window W is transparent to radio-frequency signals. In optical contexts, windows W may be more transparent to one or more wavelengths of light than surrounding portions of layer 16.

For example, layer 16 may be opaque to infrared light (e.g., to help prevent infrared ambient light from reaching pixels in display 14). To allow infrared proximity sensor signals to be transmitted and/or received and/or to allow other infrared optical components to operate through layer 16, layer 16 may be provided with one or more windows W that are infrared transparent. These infrared transparent windows may exhibit higher infrared light transmission than surrounding portions of layer 16 and may overlap infrared optical proximity sensor components or other infrared optical components. Windows W may be formed from one or more canes of fibers or other image transport layer material that has desired properties (e.g., locally reduced conductivity, locally enhanced infrared light transmission, and/or other selectively altered electrical properties, mechanical properties, and/or physical properties for enhancing the operation of an overlapped electrical component in device 10.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
a display configured to produce an image; and
an image transport layer configured to receive the image at an input surface and to transport the received image to an output surface, wherein the image transport layer has a central portion and a peripheral portion that runs along a peripheral edge of the central portion, wherein the peripheral portion and the central portion are characterized by an elastic modulus, wherein the elastic modulus has a first modulus value in the peripheral portion and a second modulus value in the central portion, and wherein the first modulus value is less than the second modulus value, wherein the central portion includes a plurality of window portions and a surrounding portion that surrounds the plurality of window portions, wherein the plurality of window portions and the surrounding portion are characterized by a property, and wherein the property has a first value in the plurality of window portions and a second value in the surrounding portion that is different than the first value.

2. The electronic device defined in claim 1 wherein the image transport layer comprises a coherent fiber bundle having fiber cores, fiber cladding, and binder and wherein there is a different binder fraction associated with the binder in the peripheral portion than in the central portion.

3. The electronic device defined in claim 1 wherein the image transport layer comprises a coherent fiber bundle having fiber cores, fiber cladding, and binder and wherein the binder has a different elastic modulus in the peripheral portion than in the central portion.

4. The electronic device defined in claim 1 wherein the image transport layer comprises a coherent fiber bundle having fiber cores, fiber cladding, and binder and wherein the fiber cladding has a higher light absorption in the peripheral portion than in the central portion.

5. The electronic device defined in claim 1 wherein the property comprises a light transmission spectrum and wherein the light transmission spectrum of the image transport layer in the plurality of window portions is different than in the surrounding portion.

6. The electronic device defined in claim 1 wherein the property comprises radio transparency and wherein the image transport layer has more radio transparency in the plurality of window portions than in the surrounding portion.

7. The electronic device defined in claim 1 wherein the image transport layer has an additional property that varies as a function of distance into the image transport layer from the output surface.

8. The electronic device defined in claim 7 wherein the output surface comprises material selectively exposed to a chemical to adjust the additional property.

9. The electronic device defined in claim 7 wherein the output surface comprises material selectively exposed to energy to adjust the additional property.

10. An electronic device, comprising:
a display configured to produce an image; and
an image transport layer configured to receive the image at an input surface and to transport the received image to an output surface, wherein the image transport layer has a central portion and a peripheral portion that runs along a peripheral edge of the central portion, wherein the peripheral portion and the central portion are characterized by an elastic modulus, wherein the elastic modulus has a first modulus value in the peripheral portion and a second modulus value in the central portion, wherein the first modulus value is less than the second modulus value, wherein the image transport layer comprises a plurality of canes of fibers, wherein each cane of the plurality of canes has fiber cores, cladding, and binder, wherein the plurality of canes have a property, and wherein the property has a first value in the plurality of canes in the peripheral portion and a second value in the plurality of canes in the central portion.

11. The electronic device defined in claim 10 wherein the property comprises an electrical property.

12. The electronic device defined in claim 10 wherein the property comprises an optical property.

13. The electronic device defined in claim 10 wherein the property comprises a property of the binder.

14. The electronic device defined in claim 10 wherein the property comprises a property of the cladding.

15. The electronic device defined in claim 10 wherein the property comprises a property of the fiber cores.

16. The electronic device defined in claim 10 wherein the peripheral portion has a ring shape and surrounds all sides of the central portion.

17. The electronic device defined in claim 10 wherein the peripheral portion has a straight strip shape and extends along part of the central portion.

18. The electronic device defined in claim 10 wherein the peripheral portion has a U shape and runs along three sides of the central portion.

19. An electronic device, comprising:
a display configured to produce an image; and
an image transport layer configured to receive the image at an input surface and to transport the received image to an output surface, wherein the image transport layer has a central portion and a peripheral portion that runs along a peripheral edge of the central portion, wherein the peripheral portion and the central portion are characterized by an elastic modulus, wherein the elastic modulus has a first modulus value in the peripheral portion and a second modulus value in the central portion, and wherein the first modulus value is less than the second modulus value, wherein the image transport layer comprises a coherent fiber bundle having fiber cores, fiber cladding, and binder, and wherein there is a different binder fraction associated with the binder in the peripheral portion than in the central portion.

* * * * *